US008090241B2

(12) United States Patent
Rajakarunanayake et al.

(10) Patent No.: US 8,090,241 B2
(45) Date of Patent: Jan. 3, 2012

(54) SYSTEM AND METHOD FOR SIMULTANEOUS NETWORK RECORDING AND PLAYBACK OF DIGITAL TELEVISION PROGRAMS

(75) Inventors: Yasantha Rajakarunanayake, San Ramon, CA (US); Jose Rubio, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1175 days.

(21) Appl. No.: 11/803,877

(22) Filed: May 15, 2007

(65) Prior Publication Data

US 2008/0285945 A1 Nov. 20, 2008

(51) Int. Cl.
*H04N 5/76* (2006.01)
*H04N 5/765* (2006.01)
*H04N 5/935* (2006.01)
*G06F 15/167* (2006.01)
*G06F 15/16* (2006.01)

(52) U.S. Cl. ........ 386/291; 386/200; 386/213; 709/212; 709/230; 709/231; 709/237

(58) Field of Classification Search ............ 386/46, 386/200, 213, 230, 231, 235, 291; 709/212, 709/230, 231, 237
See application file for complete search history.

(56) References Cited

U.S. PATENT DOCUMENTS

| 6,023,731 | A  | * | 2/2000  | Chawla ............... 709/231 |
| 6,247,059 | B1 | * | 6/2001  | Johnson et al. ......... 709/237 |
| 2001/0019658 | A1 | * | 9/2001  | Barton et al. ........... 386/46 |
| 2001/0040925 | A1 | * | 11/2001 | Abelard et al. ....... 375/240.26 |
| 2002/0010928 | A1 | * | 1/2002  | Sahota .................. 725/40 |
| 2003/0016944 | A1 | * | 1/2003  | Kato ..................... 386/46 |
| 2005/0021864 | A1 | * | 1/2005  | Sherman et al. ......... 709/247 |
| 2006/0176862 | A1 | * | 8/2006  | Ishimori et al. ......... 370/338 |
| 2006/0215695 | A1 | * | 9/2006  | Olderdissen ............ 370/469 |
| 2008/0109554 | A1 | * | 5/2008  | Jing et al. .............. 709/230 |
| 2008/0240111 | A1 | * | 10/2008 | Gadelrab ............. 370/395.7 |

FOREIGN PATENT DOCUMENTS

WO     WO 92/22983     * 12/1992

* cited by examiner

*Primary Examiner* — Thai Tran
*Assistant Examiner* — Hung Dang
(74) *Attorney, Agent, or Firm* — Brake Hughes Bellermann LLP

(57) ABSTRACT

A method of playing back a television program on a playback device connected to a local area network while simultaneously storing a television program on a storage device connected to the network is disclosed. The method includes receiving a television broadcast that includes at least one program at a first settop box. A first program is stored on a permanent storage device of a network storage server connected through a network to the first settop box. While receiving the television broadcast and while storing the first program, a program is rendered on a digital media rendering device connected through the network to the first settop box.

17 Claims, 7 Drawing Sheets

SYSTEM AND METHOD FOR SIMULTANEOUS NETWORK RECORDING AND PLAYBACK OF DIGITAL TELEVISION PROGRAMS

This description relates to streaming of digital media and, in particular, to a system and method for network recordings of live digital television programs and time-shifted playbacks for diskless digital settop boxes using HTTP and TCPIP protocols.

BACKGROUND

As Internet based broadband systems have become widely deployed, the display of high-quality streaming media (e.g., television signals) delivered through Internet protocol ("IP") based networks has been contemplated. Many vendors seek both to display media as well as to stream digital media in various customer premises, including digitally connected homes. However, because of the high bandwidth and processing power required to deliver and display digital video, it is quite challenging to provide high quality IP-based television ("IPTV") functionality using traditional settop box ("STB") capabilities.

Moreover, homes can be equipped with multiple STBs to provide for the rendering of television programs at multiple locations within the home (e.g., living room, kitchen, various bedrooms). Furthermore, STBs can be equipped with a storage medium, so that programs received from a broadcaster can be stored for later, time-shifted, playback. However, equipping each STB in the home with a storage device for storing television programs can become expensive.

SUMMARY

Accordingly, a network of digital settop boxes for storing and playing back digital media received from a broadcaster is disclosed herein, in which each of the settop boxes can render the digital media, but where each STB need not be equipped with a storage medium for storing content for later playback. Rather, a subset of the STBs or a dedicated device, connected through a network to the playback STBs, can function as a storage server for receiving and recording digital media content for later playback by the STBs.

In a first general aspect, a method of playing back a television program on a playback device connected to a local area network while simultaneously storing a television program on a storage device connected to the network is disclosed. The method includes receiving a television broadcast that includes at least one program at a first settop box. A first program is stored on a permanent storage device of a network storage server connected through a network to the first settop box. While receiving the television broadcast and while storing the first program, a program is rendered on a digital media rendering device connected through the network to the first settop box.

Implementations can include one or more of the following features. For example, the program that is stored on the network storage server can be different than the program that is rendered on the digital media rendering device. The program that is rendered on the digital media rendering device can be a time-shifted version of the program that is stored on the network storage server. The first settop box can be different from the digital media rendering device. The method can also include storing a second program on the network storage server, wherein the network storage server is also connected through the network to the second settop box. The method can include, rendering another program on a second digital media rendering device connected through the network while receiving the television broadcast and while storing the program, and the other program can be included in the television broadcast or can be received from the memory device that is part of the network storage server.

Storing the at least one of the programs on the network storage server can include the following steps: establishing a connection between the settop box and the network storage server for a session according to a TCP/IP protocol; receiving a data packet from the settop box at the network storage server, where the data packet includes payload data and a header; defining a packet header template for acknowledging the receipt of the data packet, where the template has a plurality of static fields filled with static values and a variable field adapted for carrying the value of a sequence number identifying the ACK packet within a sequence of a plurality of ACK packets sent from the network storage server to the network receiving during the session; storing the header template in a memory location of a memory device of the network storage server; updating the packet-dependent values of the variable fields of the template stored in the memory device; and sending an ACK packet that includes the a copy of the updated packet header from the network storage server to the settop box to acknowledge the receipt of the packet. The static fields can include a source field, a destination field, and a window size field. In addition, updated packet-dependent values can be written from a CPU cache to the template stored in the memory, where at least one static value used in ACK packet header is not written from the template to the CPU cache and back to the memory device.

Storing the first program on the network storage server can include writing the first program to a storage medium that is part by the network storage device through at least one DMA link to the storage medium. Storing the first program on the network storage server can include writing the program in discrete video frames to a storage medium that is part of the network storage server and generating a time index of video frames of the program, and the time index can be used when playing back the program from the storage medium, so that the program can be rendered based on an accurate timestamp.

In another general aspect, an apparatus for playing back a television program on a playback device connected to network while simultaneously storing a television program connected to the network is disclosed. The apparatus includes an edge device adapted for receiving a television broadcast, where the television broadcast includes a least one program, and a network storage server connected through a network to the edge device. The network storage server includes a storage medium and is adapted for receiving a first program from the edge device and storing the first program on the storage medium. The network storage device is adapted for streaming a program for rendering on a digital media rendering device connected through the network to the storage server while it stores the first program.

Implementations can include one or more of the following features. The edge device can include the digital media rendering device, and the program being rendered can be a time-shifted version of the program being stored. The network storage server can be further adapted for streaming, while storing the first program, a first program for rendering on a first digital media rendering device connected through the network to the storage server and for steaming a second program for rendering on a second digital media rendering device connected through the network to the storage server. The network can include a wireless network and/or a wired network. The apparatus can include a DMA engine for writing the program in discrete video frames directly to the storage medium and for generating a time index of video frames of the program, and the time index can be used when playing back the program from the storage medium, so that the program can be rendered based on an accurate timestamp. The edge device may not include a storage medium adapted for storing television programs.

The network storage device can receive television program in a stream that includes a plurality of data packets, and the network storage device can include a central processing unit, a random access memory, a network interface device, and a memory for storing computer-executable instructions. When executed the instructions can: cause the network interface device to establish a connection with the edge device for a session according to the TCP/IP protocol; cause the central processing unit to define a packet header template and store the header template in the random access memory, the template having a plurality of static fields filled with static values and variable fields that can acquire packet-dependent values, where the variable fields include a sequence number field and an acknowledgement number; cause the central processing unit to assign acknowledgement number values to acknowledgement number fields of a header template for ACK packets to acknowledge each of the plurality of data packets; and cause the network interface device to send the ACK packets to the edge device to acknowledge the receipt of a data packets, where the ACK packets include a copy of the packet header template, including the assigned acknowledgement and sequence numbers.

The details of one or more implementations are set forth in the accompanying drawings and the description below. Other features will be apparent from the description and drawings, and from the claims.

DETAILED DESCRIPTION

Figure 1:
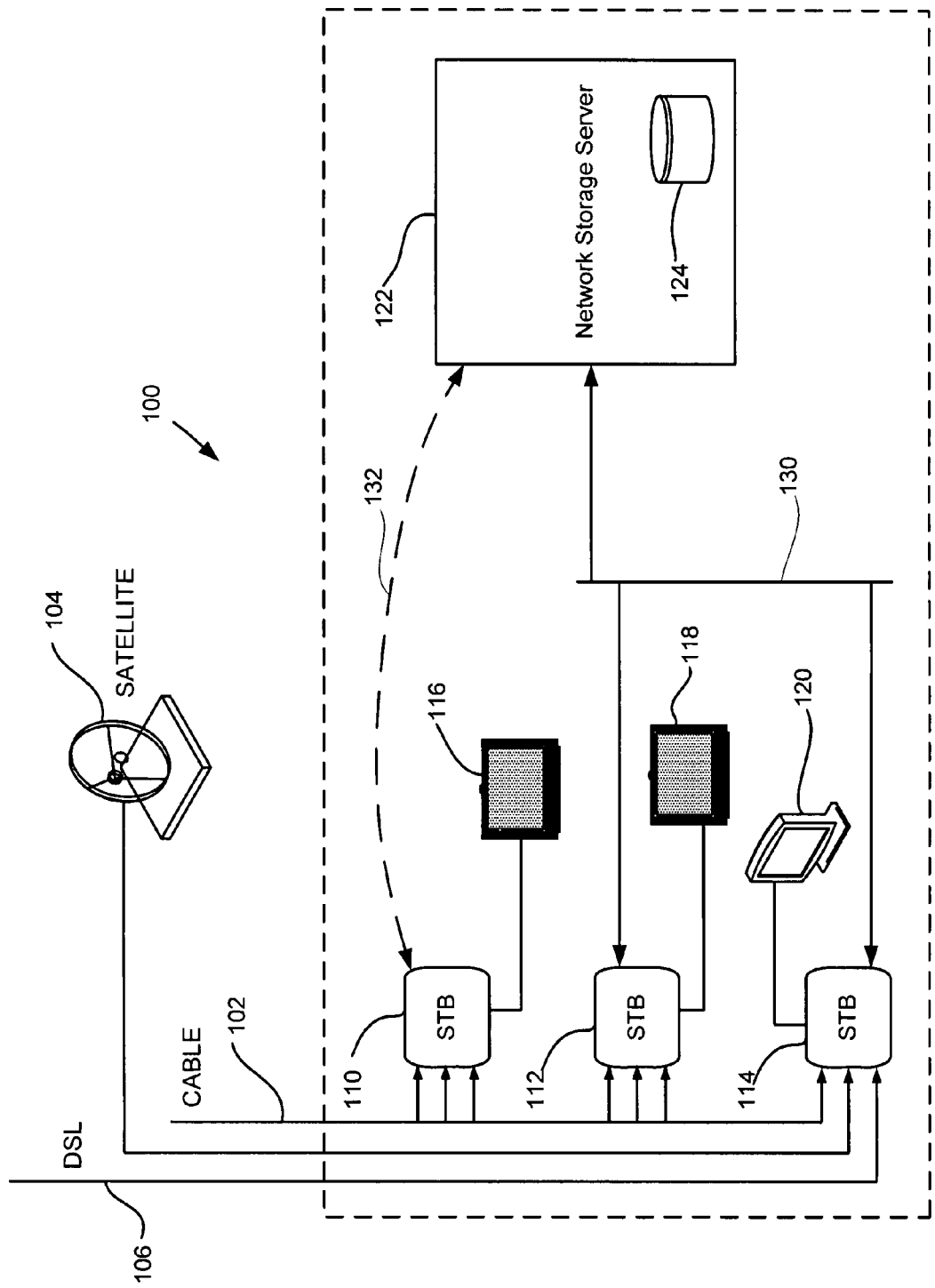
FIG. 1 is a block diagram of a local area network for recording and playing back television programs on a variety of devices connected to the network.

FIG. 1 is a block diagram of a local area network (LAN) 100 for recording and playing back television programs on a variety of devices connected to the network. Television broadcasts can be received from one or more broadcasters that broadcast signals that encode television programs. For example, an affiliate of a television network (e.g., ABC, NBC, CBS, FOX) can broadcast an television program on a very high frequency (VHF) channel or on an ultra high frequency (UHF) channel, and the broadcast program can be received by the LAN 100 for playback. A television broadcaster also can broadcast multiple signals for encoding multiple televisions programs. For example, a cable television provider can broadcast multiple television programs over a cable 102 that is routed to the LAN 100, so that one or more programs can be selected from the broadcast for viewing or recording on a device connected to the LAN. Other broadcast mechanisms are also possible. For example, multiple television programs can be broadcast over a satellite connection 104 to the LAN 100. In another example, multiple television programs can be broadcast over a high-speed Internet connection (e.g., a digital subscriber line (DSL) connection 106) to the LAN 100. For example, a digital television broadcast can be received over an Internet Protocol (IP) network to provide Internet Protocol television (IPTV) to a subscriber. For residential users, IPTV can be provided in conjunction with "video on demand," which allows the subscriber to select a particular television for viewing that would not otherwise be provided to the subscriber. Thus, the television program can be received from a variety of signal sources, including, for example, a satellite dish, a coaxial, cable, a telephone line (including DSL connections), a broadband over power line connection, an IP Network, or a VHF or UHF antenna.

When a television broadcast is received at the LAN 100, a television program carried by the broadcast signal can be routed to one or more STB's 110, 112, and 114 that are connected to one or more television display devices 116, 118, and 120. Generally, the STB's route television programs and digital signals that encode the television program. If the television broadcast is an analog broadcast (e.g., a VHF or UHF broadcast), an analog to digital converter in the STB can convert the incoming analog signal into an outgoing digital signal. The digital signals can be encoded and compressed before transmission and storage. The television display devices can be any display device for rendering a television program to a viewer, for example, a traditional cathode ray tube (CRT) based television set 116 or 118, or a flat panel plasma or liquid crystal display (LCD) based device 120. The display device normally associated with a personal computer (e.g., a computer monitor) can also be used as one of the television display device. The STB's 110, 112, and 114 can include electronic tuner circuitry adapted for demultiplexing a television program from the television broadcast received by the LAN 100, so that the program can be rendered on the display device associated with the STB. The STB can be a built-in component of the display device (e.g., in the case of a "cable ready" television set, or DTV), or the STB can be an external device that is connected to the display device by one or more wires. For example, special external digital STB's can receive a digital television broadcast and decode the broadcast for a television set that does not have a built-in digital tuner. In the case of direct broadcast satellite (mini-dish) systems, such as those offered by SES Astra, Dish Network, and DirecTV, the STB can be an integrated receiver/decoder. In the case of IPTV, the STB can be a small computer, application specific integrated chip (ASIC), or other electronic circuitry for providing two-way communication with an IP network and for decoding digital media streamed from the IP network to the STB for playback on the display device.

Within the LAN 100, the STB's 110, 112, and 114 can be connected though a digital network to a network storage server 122 that includes a permanent storage medium (e.g., hard disk storage or an optical disk storage) 124 for storing television programs received at the LAN 100 from the cable connection 102, the satellite connection 104, or the Internet connection 106, so that the stored programs can be played back on a display device 116, 118, or 120, sometime after the programs were received. The STB's 110, 112, and 114 can be connected to the network storage server 102 via a wired network connection 130 or a wireless network connection 132. The wired network connection 130 can be an Ethernet network through which STB's 112 and 114 can communicate with the network storage server 122, and the wireless network connection 132 can be an 802.11 wireless network through which a STB 116 can communicate with the network storage server 122. The LAN 100 can exist, for example, within the home of a subscriber of various television programs. Thus, the subscriber may have multiple display devices 116, 118, and 120 positioned in different locations with the home, and the display devices can be connected to different STB's 110, 112, and 114. In one implementation, the STB's 110, 112, and 114 in the subscriber's home can be connected to a single network storage server 122 that can be used to store television program for later playback. In such an implementation, each STB 110, 112, and 114 need not include a permanent storage device for storing television programs. Rather, each of these "edge devices" can be equipped with circuitry for decoding television programs signals for playback on a display device, where the television program is received either from outside the LAN 100 (e.g., from the cable connection 102, the satellite connection 104, or the Internet connection 106) or from the network storage server connected to the LAN, but can be built more economically than a STB that must include a local permanent storage device for storing programs for time-shifted playback.

When a television broadcast is received at the LAN 100, a television program in the broadcast can played back on display device 116, 118, or 120 while simultaneously storing the television program on a permanent storage device 124 connected to the network. A television broadcast can be received from the cable network 102, the satellite network 104, or the broadband network 106, and a television program within the broadcast can be stored on the storage device 124 while simultaneously rendering a program within the broadcast on a playback device 116, 118, or 120 connected to the network. The program that is played back on the playback device 116, 118, or 120 can be a timeshifted version of a program that was received and stored on the storage device 124 at an earlier time. For example, in one implementation, a television program can be recorded to the storage device 124 while simultaneously playing back a time shifted version of the program. This implementation can allow a viewer to continuously record a live television program to the storage device 124 while simultaneously playing back timeshifted portions of the program. Thus, a viewer can continuously record a live program of a sports event to the network storage server 122 while simultaneously replaying highlights of the event on a display device 116, 118, or 120. The display device 116, 118, or 120 and the STB 110, 112, or 114 locally connected to the display device can be diskless, such that recording of the television program must be stored on a networked storage device 124, such as the storage device on the network storage server 122. The timeshifted version of the television program that is played back on the display device 116, 118, or 120 can be received at a STB 110, 112, or 114 from the network storage server 122 for playback on the display device.

Figure 2:
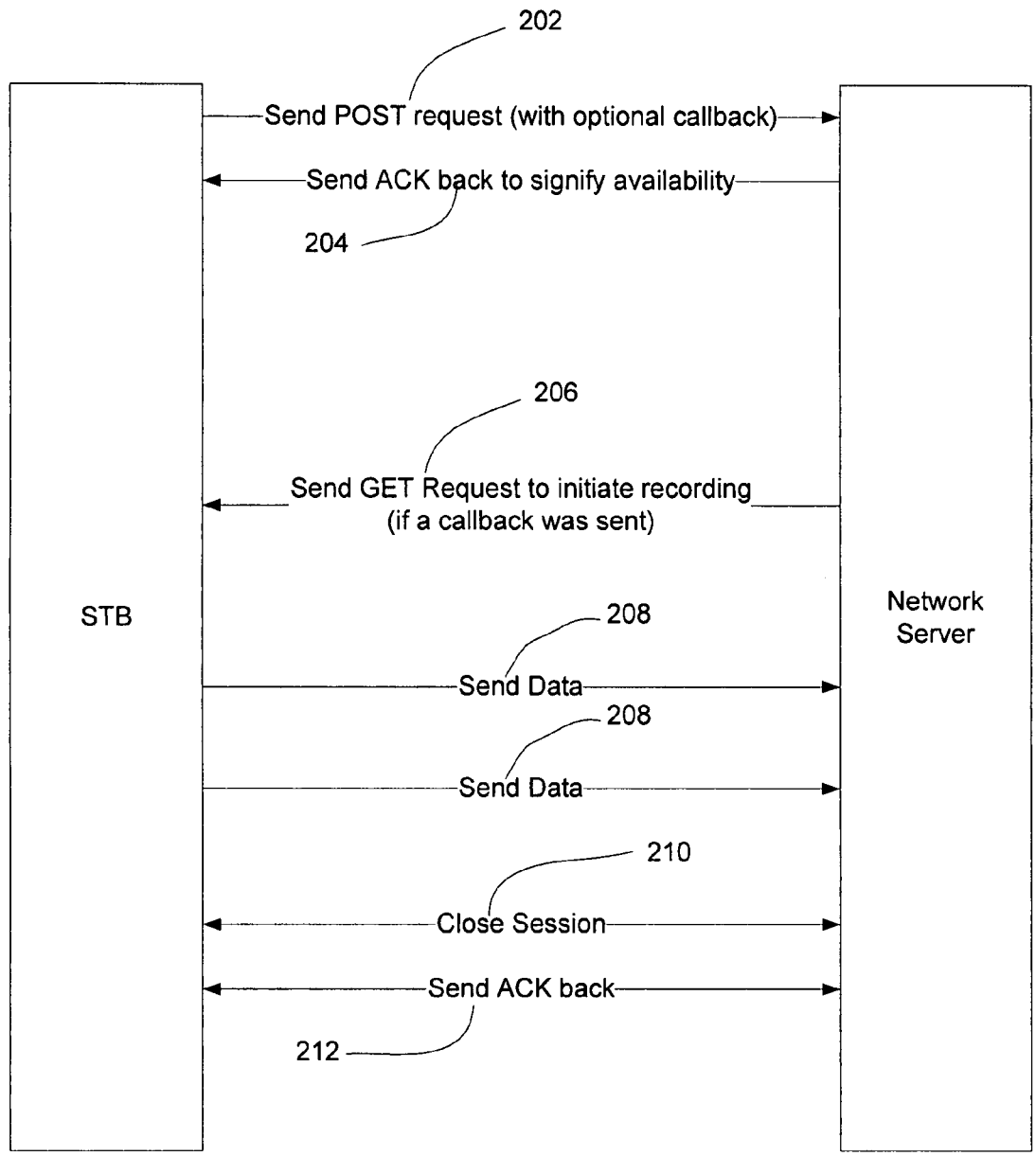
FIG. 2 is a flow chart of a method in which a session is established for recording a television program from a settop box to the permanent storage device of the network storage server over a network.

FIG. 2 is a flow chart of a method in which a session is established for recording a television program from a STB 110, 112, or 114 to the permanent storage device 124 of the network storage server 122. A user of the STB (e.g., subscriber of the television broadcast received over the network 102, 104, or 106) can program the STB to record a user-specified television program from the television broadcast. In one implementation, the STB 110, 112, or 114 that initiates the recording can send a message with a callback uniform resource locator (URL) or uniform resource identifier (URI) to the network storage server 122, so that the storage server 122 can pull the television program from the STB for recording. The pull method allows the STB 110, 112, or 114 to buffer data until it is ready to be pulled, and/or to retransmit data packets from a temporary ring buffer at the STB 110, 112, or 114, which can reduce potential dataflow bottlenecks at the network storage server 122.

The control of the record can be performed by a passive control flow socket via an HTTP connection using a TCP/IP protocol between the STB 110, 112, or 114 and the network storage server 122 with a simple initial message from the STB and a response from the storage server 122. The record session can be closed by closing the TCP/IP connection between the STB and the storage server. Either the STB 110, 112, or 114 or the network storage server 122 can close the session, and the closure of the session can include closure of the passive flow control socket by a close socket connection message to the network storage server 122 by the STB 110, 112, or 114.

As shown in FIG. 2, the record process on the network storage server 122 can be started with a trigger from the STB 110, 112, or 114, and this can be implemented with a HTTP server process attached to a local TCP Port-number. Thus, a recording session can be initiated by the STB 110, 112, or 114 issuing a POST command to the network storage server 122 (step 202), and an acknowledgment response from the network storage server (step 204). When the POST command is issued in step 202 a callback request can optionally be sent from the STB to the server. If a callback request is sent, then the server sends an HTTP GET request to the STB to initiate the recording (step 206).

The STB 110, 112, or 114 uses information about the IP-address/name of the network storage server 122, the server TCP port number, the availability of this network record service, and how to access it to stream data to the storage device 122. With each recording session the following information is specified to the storage server 122: the video filename of the television program being recorded; the video type, which can be defaulted to Moving Picture Experts Group (MPEG) type, but which can also be another video type, such as, packetized elementary stream (PES), Advanced Video Coding (AVC); the program clock reference, (PCR) program ID (PID), or Video PID, so that the server 122 can create an index file of video frames of the stored television program, so that the stored program can be played back with proper timing. Other information can also be provided, such as, for example, an audio PID, and audio type, the duration of the program, etc. If more than one television program is being recorded from the television broadcast, then multiple PID can be specified to the network storage server. Additionally, a callback uniform resource identifier (URI) can be provided with the POST request to the network storage server 122, so that the server can pull record data from the STB 110, 112, or 114, over an IP protocol.

Messaging between the STB 110, 112, or 114, and the storage server 122 can be performed using HTTP header options, which specify recording parameters and provide a simple way to parse and understand parameters passed by STB 110, 112, or 114 to the server 122. An example HTTP header for a record request, with a hypothetical schema identified by the tag "Network-AV-Record.schemas.broadcom.com," is shown below in Table 1.

TABLE 1

HTTP Header for Record Request:
POST /record-url HTTP/1.1
Content-Type: text/html
Network-AV-Record.schemas.broadcom.com: File-Name: Jurassic-Park.mpg
Network-AV-Record.schemas.broadcom.com: Event-Start: Sat, 01 Jan 2006 00:05:30 GMT
Network-AV-Record.schemas.broadcom.com: Event-Duration = 1:30:00.000
Network-AV-Record.schemas.broadcom.com: Connection = keep-alive
Network-AV-Record.schemas.broadcom.com: Event-URL = http://192.168.1.101:5000/record0
Network-AV-Record.schemas.broadcom.com: Event-Type = Live-Event
Network-AV-Record.schemas.broadcom.com: Video-Type: Mpeg2-TS
Network-AV-Record.schemas.broadcom.com: Audio-Type: 0x81
Network-AV-Record.schemas.broadcom.com: Audio-PID: 0x34
Network-AV-Record.schemas.broadcom.com: Video-PID: 0x31
Network-AV-Record.schemas.broadcom.com: PCR-PID: 0x31
Network-AV-Record.schemas.broadcom.com: Encryption-Type: 3DES
Network-AV-Record.schemas.broadcom.com: Client-ID: xxxx-xxxx-xxxx-xxxx-xxxx-xxxx
Network-AV-Record.schemas.broadcom.com: Version: 1.0.1

The first line in the HTTP header identifies the record-URL, which can be advertised by the network storage server 122 to the STB, and also identifies the HTTP protocol version. Different record-URL's may be advertised by an individual network storage server 122, depending on various policy-based constraints on content streamed to the server. The "Content-Type" line indicates the media type of the data sent to from the STB to the network storage server 122.

The "File-Name" is the suggested filename of the file for storing the television program stored on the server 122. The "Event-Start" field instructs the network storage server 122 to start the recording by connecting to the STB 110, 112, or 114 at the specified universal time, but if the recording is required immediately, this field may be omitted. The "Event-Duration" field instructs the server 122 to record up to and no more than the specified number of hours:minutes:seconds.milliseconds from the Event Start time, and provides a mechanism to limit duration on the recording on the storage device 124 of the storage server 122.

The "Event-URL" is the callback URL for the server 122 to connect to the STB 110, 112, or 114 to receive the binary data related to the video recording requested. It is the STB's responsibility to start the content immediately after the response from the server is received. The URL usually specifies an HTTP protocol. However, other formats are allowed, such as RTP and UDP, so that other URL formats would be usable. The event URL is optional, and recording may immediately commence by clients sending the data directly to the server's record URL.

The "Event-Type" field can be used to identify if the recording is a live event, a real-time event, or a pre-recording that is available locally on a disk of the STB. This allows the network storage server 122 to prioritize the STB, so that minimal loss of packets will result for recordings that are most sensitive to packet loss. Also, this field can provide information about average bit-rate to be expected during the recording session.

The "Video-Type" field specifies the type of digital video transmitted from the STB to the network server. The video type could be MPEG, PES, AVC, etc. This field allows the network storage server 122 to create a file about the particular video type in the binary record stream. When a STB wants to playback the recorded television program this field allows the server 122 to hint the STB to use the specific video type. Similarly, the "Audio-Type" field specifies the audio type and allows the server to create a file about the particular audio content in the binary record stream and to hint a STB that wants to playback this content to use the specific audio type.

The "Audio-PID" field identifies the audio program associated with the television program that is to be recorded. One or more audio programs may be present in the recording, and a secondary audio PID, or various languages, etc. can be specified with this field. The Audio-PID field allows the network server 122 to hint a STB 110, 112, or 114 that wants to playback this content to use the audio program associated with the specific audio PID. Similarly, the "Video-PID" field identifies the video program and is used by the network server 122 to create a file about the particular video content in the binary record stream, which allows the server 122 to hint a STB that wants to playback this content to use the video content specified by the specific video PID.

The "PCR-PID" field is used for an mpeg transport stream and specifies the program clock reference. It is used for software indexing of transport streams at the network server 122. An "Encryption-Type" value can be send from the STB 110, 112, or 114 to the network storage server 122, and designation codes such as "encrypt at client," "encrypt at server," "decrypt at client," "decrypt at server," and encryption algorithms such as 3DES, AES, etc. can be designated with this field.

The "Client-ID" field can be used for the network storage server 122 to keep track of clients. Optionally, a unique client ID could be negotiated by the STB with the server, or an industry standard Universally Unique Identifier (UUID) or Globally Unique Identifier (GUID) could be used. In one implementation, a server-assigned cookie identifying the STB or a user ID could be assigned to keep track of a client. If the STB devices 110, 112, and 114 are simultaneously recording more than one recording to the network storage server 122, a session ID and separate callbacks (i.e., event-URL's for the server 112 to identify independent record streams from different STB's 110, 112, and 114) can be provided to identify the different television programs being recorded. The "Version" field can be attached to the header fields to identify the schema version that is supported, which allows network storage servers 112 to operate with backward compatibility to older STB's 110, 112, and 114.

The HTTP protocol described above allows control of the recording by a third party. For example, a user may use a browser to create a simple HTML form with the above described fields, and the form can be forwarded to a STB 110, 112, or 114 and the network storage server 122 to initiate a recording transaction from the STB to the server 122. The protocol described here is therefore capable of a three-party model, with the server, the STB, and a control station being independent of each other, which allows flexibility in administering the recording transactions. Alternatively, more elaborate extensible markup language (XML)-based schemas can be developed to address the needs of network recordings. By using the HTTP protocol and associated parameters to describe the recording any guesswork that must be done at record time or playback time, in auto-detecting content types, which is often a costly CPU and costly resource operation, can be minimized or eliminated.

When a recording of a television program needs to be started, it can be initiated by a timer event or a remote control event, or other user event on STB-side of the network. Then, a TCP socket can be created, and an appropriate HTTP POST message can be sent from the STB to the server 122, with the required parameters (e.g., the filename, PCR-PID, and callback URL) any of the optional parameters described above. When recording a live television program, the recording must start shortly after a positive acknowledgement (step 204 in FIG. 2) is received from the server 122 to STB 110, 112, or 114. Then, the television program to be recorded is sent from the STB 110, 112, or 114 to the server 122 (step 208). The recording session is terminated when either the STB 110, 112, or 114 or the server 122 closes the control socket (step 210) and an acknowledgment is sent back from the server 122 or the STB 110, 112, or 114, (step 212) or when the content duration expires on server-side of the network.

To allow a viewer to switch seamlessly between watching a live program received from one of a network connections 102, 104, or 106 while the program is recorded to network storage server 122 and a timeshifted version of the program that is streamed out of the network storage server, the live content should be recorded in a timely fashion and error free (i.e., in real time and without dropped packets) to the storage server 122. To achieve such performance, a transmission control protocol/Internet protocol (TCP/IP) can be used to achieve a high-speed, error-free transmission of the television program from a STB 110, 112, or 114 to the permanent storage device 124 of the network storage server 122. In particular, a record-oriented software-based TCP/IP Offload Engine ("STOE") can be used to provide a reliable stream of error-free video/audio data to a client device with very low CPU utilization within the server.

Figure 3:
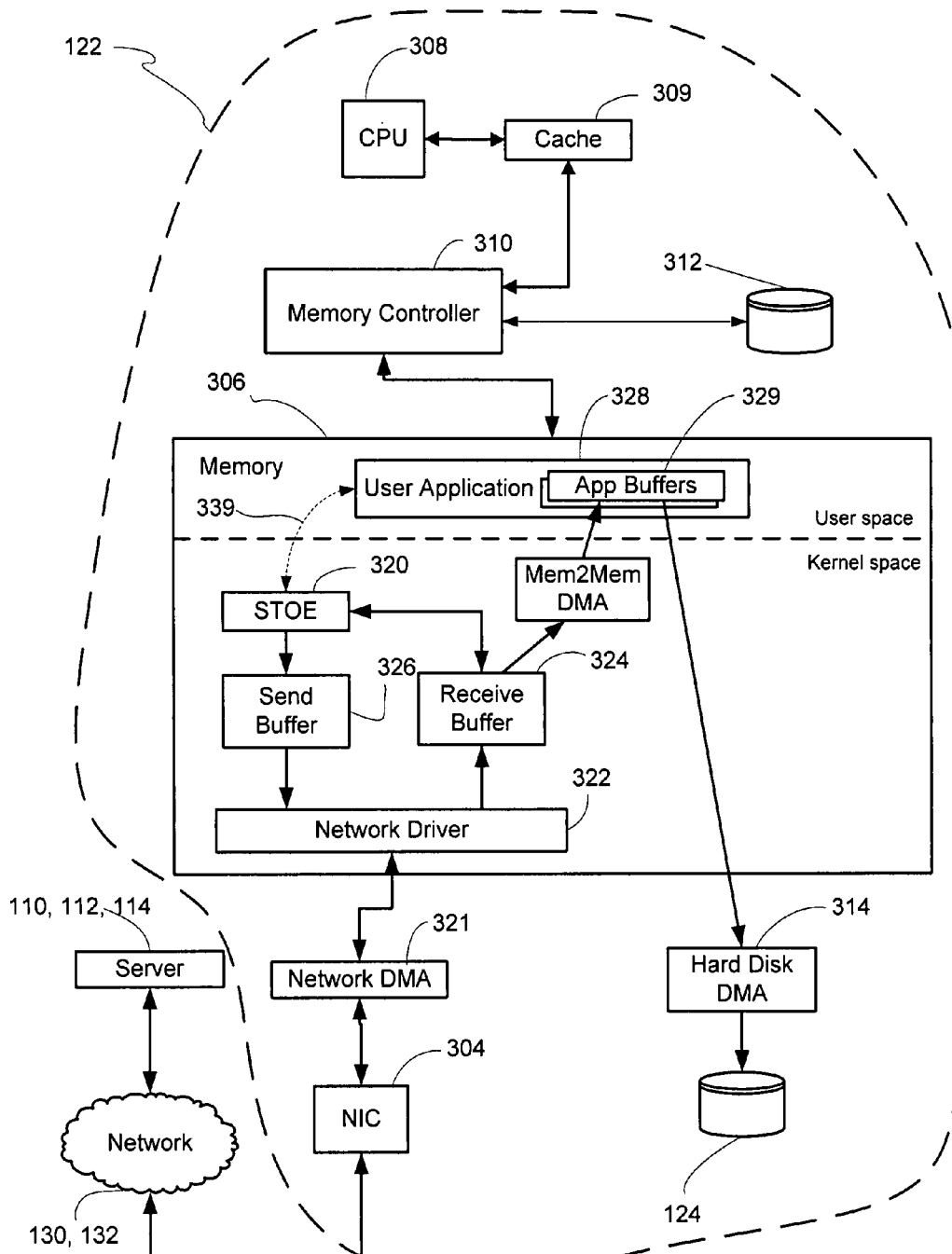
FIG. 3 is a schematic diagram of a client network storage server adapted for storing digital television programs over a network, for example, by a record-oriented software based TCP/IP offload engine for making fast and error-free transmissions of data from one network device to another.

FIG. 3 is a schematic diagram of a system in which a television program is received over a network connection 130 or 132 within a LAN 100 from a STB 110, 112, or 114 by a network storage server 122. The LAN network 100 can include a wired network connection 130 or a wireless network connection 132. The received television program data can be encoded in various transport formats, such as MPEG transport streams etc. and may be provided using a variety of protocols, such as, for example, UDP, RTP, or TCP/IP. The TCP/IP implementation is described in detail here. After reception of the television program data, the data can be stored on one or more permanent memory storage devices 124 within the network storage server 122 for later distribution to STB devices 110, 112, and 114 for playback on display devices 116, 118, or 120. The memory device 124 can be, for example, a magnetic storage medium (e.g., a hard disk), an optical disk, or a flash memory. Thus, the storage device 124 can act as a repository of the television program, from which the television program can be streamed out to one or more STB devices to render the television program in a timeshifted manner. Thus, the TCP/IP-based digital media distribution architecture shown in FIG. 3 can be used to make a digital television program available anywhere in the premises of the LAN 100 available to any rendering device 116, 118, or 120 connected to the LAN. After a television program has been stored on the storage medium 124, the program can be efficiently streamed a client STB 110, 112, or 114 for playback on a display device 116, 118, or 120. The playback can be timeshifted from the time at which the television was received by the storage server 122 and recorded on the storage device 124. Thus, portions of a television program can be recorded to the storage device 124 at the same time a earlier portions of the television program are played back from the storage device on a display device. For example, when a viewer is watching a live television program, the viewer can record the program and can pause and then resume the rendering of the program temporarily or can review a previously viewed portion of the program by playing back the program from the storage device while the live program continues to be recorded to the storage device.

FIG. 3 is a schematic diagram of a client network storage server 122 adapted for storing digital television programs over a network, for example, by a record-oriented software based TCP/IP offload engine for making fast and error-free transmissions of data from one network device to another. As shown in FIG. 3, TCP/IP packets of television program data can be received from a STB 110, 112, or 114 over a network connection 130 or 132 through a network interface 304. The network interface 304 can be a network interface controller (NIC), through which television program data packets pass en route to a memory device 306. The network storage server 122 includes a central processing unit 308 that performs operations on data and that, in conjunction with a memory controller 310, can copy data out of and into different locations in a main memory device 306 (e.g., random access memory ("RAM")).

The CPU 308 is operatively coupled to a local cache 309 that is generally a smaller, faster memory device that the main memory 306 and that can store copies of the data fetched from the main memory 306. The CPU 308 can perform operations on the cached data and then, once the operations have been performed, the data in the main memory 306 can be updated to be consistent with the new data in the cache 309. The server 300 also includes a non-volatile memory 312 suitable for embodying computer program instructions and data that are executed and/or processed by the processor 308. The memory 312 can be one or more of, for example, a semiconductor memory device, e.g., EPROM, EEPROM, and flash memory devices; magnetic disks, e.g., internal hard disks or removable disks. Certain elements of the system shown in FIG. 3 can all be located on a single chip to form a system on a chip ("SOC"). For example, two or more of the CPU 308, the cache 309, the memory controller 310, the memory 312, and the memory 306 can be located on a SOC.

When running the record-oriented software-based TCP/IP offload engine, TCP/IP packets can be received from a STB 110, 112, or 114 via the network connection 130 or 132, stripped of their header information, and then the data payload can be routed directly from a kernel space receive buffer 324 through a memory-to-memory direct memory access ("DMA") circuitry 334 without being passed up through a traditional TCP/IP stack and copied into user space application buffers 329. From the application space buffer 329 the data can be copied through a hard disk DMA 314 to the permanent storage medium 124 for storage. So that successful reception of packets can be acknowledged to the STB 110, 112, or 114, received data packets can be processed by the kernel space record-oriented STOE 320 that maintains state machines and logic required for sending acknowledgement ("ACK") packets back to the STB 110, 112, or 114. The record-oriented STOE 320 processes the incoming packets and decides whether to forward payload data from the packets to storage device 124 for storage, in which case the STOE 320 sends out an ACK packet, or whether to discard the packet.

The network interface 304 can communicate with the memory 306 through a network DMA 321, such that CPU resources need not be expended when receiving packets from the network 302 into a network driver engine 322 running on the storage server 112. The network driver 322 receives the packets and places them in the receive buffer 324, and the record-oriented STOE 320 analyzes header data of the buffered packets to monitor data flow during the TCP/IP session. The STOE 320 sends ACK packets to a send buffer 326 that then routes the ACK packets through the network driver 322 and out to the STB 110, 112, or 114 via the network connection 130 or 132 through the network interface 204. A user application 328 performs command and control operations on the record-oriented STOE 320. Certain elements of the system shown in FIG. 2 can all be located on a single chip to form a system on a chip ("SOC"). For example, the two or more of the CPU 308, the memory controller 310, the memory 306, and the DMA circuitry 321 and 314 can all be located on a SOC.

Thus, as shown in FIG. 3, TCP/IP packets can be intercepted as they are admitted to the network layer, before being passed to an application 328 in the user space, filtered, and validated by the record-oriented STOE 320. Data packets that match the filter criteria, and therefore are valid, can be fed to the memory-to-memory DMA 334 and into the application buffer 329, from when they are routed to the hard disk DMA 314 for storage on the storage device 124. Corresponding acknowledgement packets can be generated by the record-oriented STOE 320 and transmitted back to the STB 110, 112, or 114 to keep the connections alive.

Thus, in the system of FIG. 3, header information from the received packets need not be copied to user space buffers. This saves CPU bandwidth, memory space, and memory bandwidth, and allows a high bandwidth stream of data for one or more television programs to be received, processed, and stored on the network storage server 112. As described in more detail below, the record-oriented STOE 320 sends ACK packets based on pre-stored TCP/IP headers and performs simplified checksum computations, and reduces the latency of acknowledgement. In this manner, several processing steps that would otherwise consume CPU cycles in the data path are reduced. For example, and as described in more detail below, the acknowledgement of received packets back to the server can be simplified by using pre-stored headers, such that less data needs to be processed when sending and ACK packet; copying TCP/IP packets to user space can be eliminated; checksum validation of data can be completely eliminated in the TCP layer; and the received payload data can be fed directly from the receive buffer 324 through the memory-to-memory DMA 334 to the application buffer 329 and then to the hard disk DMA 314 without copying the data to intermediate memory locations in the user space.

Figure 4:
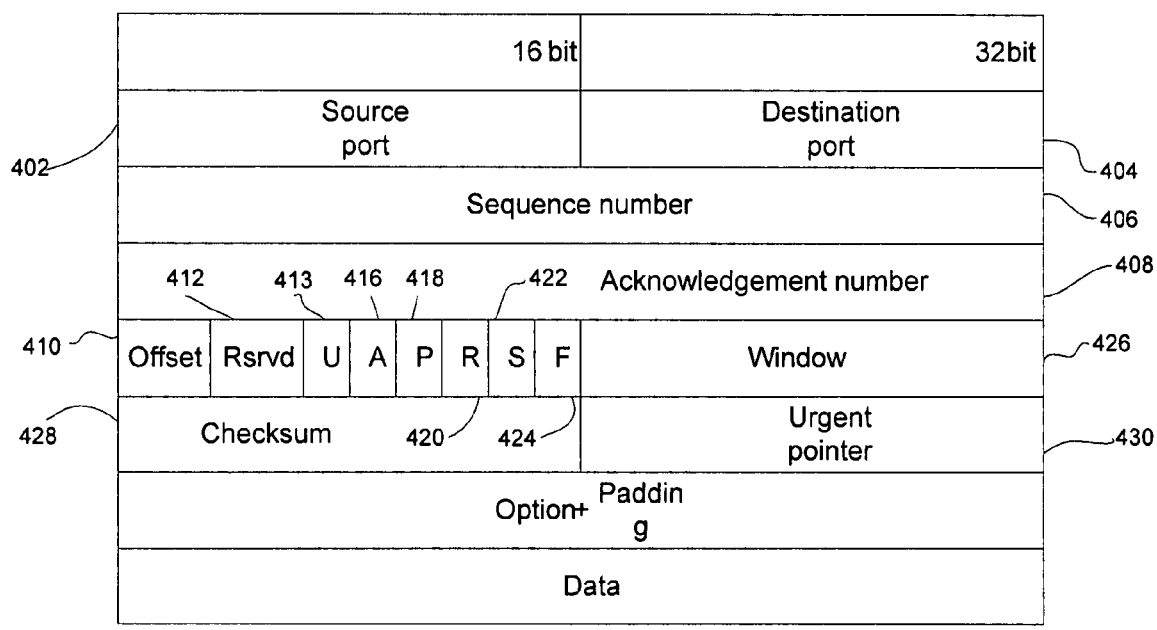
FIG. 4 is a block diagram of a TCP header template.

Several simplifications to the traditional TCP/IP protocol can be made to provide a simple record-oriented STOE that can efficiently process the receiving side traffic. FIG. 4 shows the fields of a TCP packet 400, and the role of these fields in the STOE is described below. The source port field 402 indicates the address of the port from which the packet originated and is used in the STOE 320 for packet filtering. The destination port field 404 indicates the destination port or MAC address of the packet and can be ignored in the STOE 320 because the STOE can assume that packets received during a TCP/IP session that are otherwise valid have been sent to the correct destination port.

During normal operation, after a TCP/IP session has been established between the client and the server, the sequence number field 406 contains the sequence number of the first data octet in this segment. However, when a synchronize ("SYN") packet is present to initiate a new connection and synchronize the sequence numbers between the STB 110, 112, or 114 and the network storage server 122, the sequence number field 406 contains the initial sequence number ("ISN"), and the value of the first data octet is ISN+1. The record-oriented STOE 320 compares the sequence numbers of received packets with the next expected sequence numbers to check if packets are out of order or have been dropped.

If the ACK control bit is set, the acknowledgement number field 308 contains the value of the next sequence number that the sender of the segment is expecting to receive. Once a connection is established, this value is always sent. In the STOE operation, for packets transmitted from the network storage server 122 to the STB 110, 112, or 114, this number is recomputed with the transmission of each ACK packet. The data offset field 410 contains the number of 32-bit words in the TCP header, which indicates where the data begins. The TCP header (even one that includes options) generally has a length that is an integral number of 32 bits. When using the STOE 320, the value of the offset field value can bet set to a constant value (e.g., 8), which gives a 32 byte TCP Header. The reserved field 412 is reserved for future use and is set to zero.

Various control bits can be set. For example, a valid urgent control bit 414 indicates that an urgent pointer field is significant. This bit is not used when operating the STOE. A valid acknowledgement control bit 416 indicates that an acknowledgement field is significant. This field is always set when operating the STOE 320. A valid push control bit 418 indicates that the session is operating in push mode. A valid reset ("RST") control bit 420 indicates that the TCP/IP connection must be reset and is used by the STOE 320 to terminate a session between the STB 110, 112, or 114 and server 122. A valid synchronize ("SYN") bit 422 is used to indicate that sequence numbers of packets must be synchronized between the server and the client. A valid finish ("FIN") control bit 424 indicates that no more data is to be sent from the sender. Thus, the STOE uses only the acknowledgement bit 416, the synchronize bit 422, the finish bit 424, and the reset bit 420, while other control bits of the TCP header can be ignored.

When using the STOE 320 on the network server side of the network 130 or 132, there is no need for sliding window adjustment, because data is consumed directly from the receive buffer 224 by the DMA 314, so the window can have a fixed size (e.g., 16 kilobytes), and the window field 426 contains this constant value. Flow control is achieved by delaying the acknowledgements of received packets, if the client-side docoder buffers are full.

The checksum field 428 is the 16 bit one's complement of the one's complement sum of all 16-bit words in the header and text of a packet. If a segment contains an odd number of header and text octets to be check-summed, the last octet is padded on the right with zeros to form a 16-bit word for checksum purposes. The pad is not transmitted as part of the segment. While computing the checksum, the checksum field itself is replaced with zeros. The received packets need not be check-summed in the STOE 320 (making checksum optional on the receive side is an optimization) because of the Ethernet cyclic redundancy check ("CRC") validity that is performed at the Ethernet datalink layer.

The urgent pointer field 430 communicates the current value of the urgent pointer as a positive offset from the sequence number in this segment. The urgent pointer points to the sequence number of the octet following the urgent data. This field can only be interpreted in segments for which the urgent control bit 414 has been set, and is unused in the STOE. The options field 432 may be transmitted at the end of the TCP header and can have a length that is a multiple of 8 bits. The data field contains the compressed television program data payload that is to be fed directly to hard disk DMA 314 for storage in the storage device 124.

To set up the record-oriented STOE 320 so that digital television program data can be routed directly to the storage device 124, a TCP/IP connection is established between the network storage server 122 and the STB 110, 112, or 114.

When the TCP/IP session is opened the record-oriented STOE 320 is instructed to acquire and store the template received when a SYN packet is sent and an SYN-ACK packet is received. This SYN-ACK packet contains relevant information to provide the STOE 320 with header information to construct valid outgoing ACK packets and to create a template for outgoing ACK packets, so that processing resources can be conserved during the exchange of packets. A helper socket can be opened during this initialization phase between a TCP/IP stack and the user application 328 to manage the establishment of routing connections and other handshaking operations during set up of the connection.

After the TCP/IP connection has been established between the STB 110, 112, or 114 and the storage server 122, the STOE operation takes over the processing of received packets, and thereafter, the record-oriented STOE 320 receives packets and causes the packets to be forwarded to the hard disk DMA 314 until the application 322 sends a stop signal. When the application 328 sends a stop signal, the STOE goes into a reset state and sends a RST signal to the STB 110, 112, or 114. This takes both the STB 110, 112, or 114 and storage server 112 back to the closed state immediately.

When initializing the TCP/IP session between the network storage server 122 and the STB 110, 112, or 114 the network storage server 122 may send a SYN packet containing a random initial sequence number from to the STB 110, 112, or 114. For purposes of discussion, the value of the sequence number can be called "x." The STB 110, 112, or 114 can receive the packet, record the sequence number in the received packet, and reply with an acknowledgment and synchronization (SYN-ACK) packet that contains a synchronization number and an acknowledgment number in the TCP segment header of the packet. The value of the acknowledgement number of the packet sent from the STB 110, 112, or 114 is the next sequence number that the network storage server 112 expects to receive from the STB, i.e., x+1. The STB 110, 112, or 114 also initiates a return session by including as the sequence number of the packet its own initial sequence number value that may be called "y." Finally, the network storage server 122 sends an ACK packet back to the STB 110, 112, or 114, which contains a sequence number value equal to x+1 and an acknowledgment number value equal to y+1. At this point, both devices have received an acknowledgement of the connection, and the session is open to transfer data.

The network storage server 122 can handle SYN handling and setting up the TCP/IP session without the STOE 320 with the use of a helper socket between the TCP/IP stack in kernel space and the user application in the user space. The socket, after it goes into a connected state, can indicate to the STOE 320 to take over communications, and then the storage server 122 may close the socket at the application layer, while the STOE 320 maintains the TCP/IP connection with the STB 110, 112, or 114.

After establishment of the TCP/IP connection, the STB 110, 112, or 114 sends packetized data to the storage server 122. The storage server's last acknowledged ACK-SEQ number is compared with the SEQ number of the packet that is ready to be sent out from the STB 110, 112, or 114, and if the storage server's ACK number does not match the SEQ number of the next packet that is to be transmitted then retransmission of the previous packet is performed.

On the network server 122, the record-oriented STOE 320 keeps track of next expected SEQ number from the STB 110, 112, or 114, by adding the length of the last received packet to the last received SEQ number. It then constructs an ACK packet for the received packet if the SEQ number of the received packet matches the SEQ number of the next expected packet. If a match does not exist, the network storage server 122 must send an ACK packet acknowledging the most recent valid received packet. Under normal operation, if the STB 110, 112, or 114 receives three such identical ACK packets for the same sequence number, the STB goes into a fast retransmit mode and re-sends the missing packet.

The ACK packet is a minimum length 66-byte TCP packet. It has a 14-byte Ethernet header, a 20 byte IP header, and a 32 byte TCP header. Because the length of the header is fixed at 66 bytes, and the values of the port fields 402 and 404, the window size and the offset are all fixed, the only variable quantities in the ACK packet are the TCP control bits used by the STOE, i.e., the SYN control bit 422, the FIN control bit 424, and the RST control bit 420, and the acknowledgement number 408, the sequence number 406, and the checksum value 428.

Therefore, a precomputed ACK packet template based on the first received packet from the STB 110, 112, or 114 can be stored in memory and used to prepare ACK packets very efficiently to send out. By using a prestored template, CPU resources are reduced when preparing ACK packets to send to the server. An initial packet template can be created by a simple interchange of the Ethernet destination port value of the received packet and the source ports value in the template, a similar interchange between the IP destination and source port values and the TCP destination and source port values, and by setting specific fields in the IP and TCP header fields. For example, in the Ethernet header portion of the template, the Ethernet destination MAC address of the template can be filled in based on the source address value in the first packet received from the server. The Ethernet source MAC address in the template can be filled in from the destination address value in the first packet received from the server. The Ethernet type value in the template can be filled in based on the value of the Ethernet type used in the first received packet.

In the IP header portion of the template ACK packet, the following values can be used. The IP Type of Service ("TOS") value can be selected to give the network priority in data transmission; usually setting this value to zero will suffice. The IP ID value is set to zero=0 because this field is usually ignored when packets are not fragmented. The IP Frag_Offset value is set to zero=0 to indicate that packets are not fragmented. The IP time to live ("TTL"), which is used to determined the number of hops/links over which the packet may be routed, is set to 4, which is a relatively a small number to make sure packets do not travel through too many hops. The IP Version value is set to 4, which is the current version of the Internet protocol. The IP Header Length ("HeaderLen"), which is the number of 32-bit words forming the header, is set to 5. The IP Total Length ("IP TotalLen") value is set to 52, which is the sum of the IP header length (20 bytes) and the TCP header length (32 bytes). The IP Protocol value is set equal to 6, which specifies TCP. The IP Source address value is filled in from the destination address of the received packet, and the IP Destination Address is filled in from the source of the received packet. The IP header checksum value is based on a checksum calculation that can be performed using known methods. For a four byte aligned header, as may be used with the STOE, the checksum algorithm can be simplified to a known fast checksum function, ip_fast_csum.

In the TCP header of the template ACK packet, the TCP SOURCE PORT value is filled in based on the destination port value from the received packet. The TCP DESTINATION PORT value in the template can be filled in based on the source port value of the received packet. The ACK bit is set to 1, and the FIN, SYN, and RST bits are initially set to zero. The acknowledgement number and the sequence number are initially set to zero in the template packet, and the window size is set to a constant value of 16 kilobytes. The data offset value is set to 8, which specifies the header size as 32 bytes, and the values of all other fields are set to zero. An initial checksum value can be calculated based on the values of fields in the TCP header that do not change, by setting the acknowledgement number 408 and sequence number 406 fields to zero This initial checksum value for the TCP header then can be stored in the header template and re-used to perform differential checksumming on later ACK packets by adding the initial checksum value to checksum values that are calculated based on analysis of the header information that can vary in the TCP header (i.e., the acknowledgement number 408 and sequence number 406). In the normal operation of a network server 122 that is receiving data for storage, the sequence number field also is a constant value because traffic flows only in one direction, i.e., from the STB 110, 112, or 114 to the network storage server 122. This means the calculation of the checksum for an acknowledgement packet is straightforward and can be determined by adding the seq_num and the ack_seq_num to the ones complement of the prestored template checksum and then taking the ones complement of this number and substituting the resulting value into the current packet's TCP header.

In the header of an ACK packet to be returned to the STB 110, 112, or 114 from the network storage server 122, several fields (e.g., the sequence number field, the acknowledgement number field, and the FIN, SYN, and RST control bits) must be determined at the time the packet is prepared and then inserted into the template before sending the packet. If the most recently received packet is a valid packet (i.e., it was the expected packet), then the value of the ACK packet's acknowledgment number is equal to the value of the previously-received SEQ packet's sequence number plus the length of the received packet. If the last received packet is an invalid packet then the value of the ACK packet's acknowledgement number is equal to the value of the acknowledgement number of the last ACK packet that was sent from the network storage server 122 to the STB 110, 112, or 114. The sequence number of the ACK packet can be set equal to the acknowledgement number of the last valid received packet. Values of the SYN, RST, and FIN control bits can be set as appropriate to indicate that the packets need to be synchronized between the client and the server, that the connection needs to be reset, and that no more data should be sent from the server to the client. To calculate the value of the checksum field for the ACK packet, the checksum analysis is performed as described above.

After the TCP/IP header of the ACK packet has been created, the STOE 320 forwards the packet into a send buffer 326 and instructs the Ethernet DMA 321 to grab the ACK packet from the send buffer 326 and send the packet to the STB 110, 112, or 114. Then the information pertaining to variable portions of the header are flushed from a CPU-cache, and immediately sent out using the output network hardware.

When an expected packet is not received, the record-oriented STOE 320 can discard all the succeeding packets received from the network 130 or 132 until the expected packet arrives. This methodology works with latencies acceptable in the video buffer model and results in a jitter is about 200 ms of less, which can be tolerated. The STB 110, 112, or 114 that acts as a streaming video server tends to speed up after a retransmission, as it is pacing to a program clock reference ("PCR") and naturally will send data faster than normal after a retransmission.

When data packets of the television program to be recorded are received at the network storage server 122, the packets are queued in a special queue within the receive buffer 324 and processed later with a timer routine that is driven by the timer interrupt. A separate receive buffer is used for each recording session, so that multiple television programs can be recorded simultaneously. The timer can be a general software driven service that issues a triggering event periodically (e.g., every 1 ms). When the triggering event occurs a determination is made whether a sufficient number of packets (e.g., 64 or more packets) has been received in the receive buffer 324, so that a user thread may be woken up to actually start processing.

When there are a sufficient number of data packets in the queue, a chained DMA descriptor can be created, pointing to payload sections of the television program data that exists in the receive buffer 324. A 64 packet threshold can be used, but the size of this threshold can be adjusted to meet the physical needs of the data transfer. For example, for lower bit rate streams the threshold can be set lower than 64 packets.

When packets are ready to be sent out over the DMA 314, the user thread is woken, and this thread creating DMA-descriptors. The space for DMA descriptors can be assigned from the unused area in a socket buffer for receiving the packet and the space at the end of the packet. This method of assigning DMA descriptor storage from the socket buffer's unused areas has the benefit of not having to manage a separate memory objects for this purpose and allocating and freeing them, which is efficient in terms of CPU use, as the CPU is already handling the packet, and the packet header information is already stored in a data cache. Use of the CPU is required only for a DMA write-back operation, after modifying the socket buffer, before actual DMA begins.

If there are multiple record sessions occurring simultaneously, or multiple consumers to the DMA hardware, then a software or hardware semaphore can be acquired, and the user thread can be put to sleep for a few milliseconds usually until the DMA resource becomes free again. In one implementation, an interrupt driven DMA or polling based-DMA handling of the packets may be used, in which case sleeping of the thread in 1-2 ms intervals is sufficient to ensure that the DMA requests are completed. The DMA hardware resource can be switched between multiple recording sessions, based on a first-come first-served basis.

The DMA descriptor list can be submitted to the memory-to-memory DMA hardware engine that strips the network headers and aggregates the payload data to contiguous memory pages, suitable to be handled by user processes or a file-system. The hard disk DMA 314 can write television program data to the storage device 124 using the usual DMA scatter-gather process to ensure that proper sections of the television program data are written to corresponding destination pages in the physical memory device 124. In this implementation, the CPU 308 is used to create the hardware descriptor lists, and this implementation has the advantage that these set of pages are already mapped by the file-system, and can be DMA'ed directly to disk using a block oriented disk DMA in 512 byte chunks.

Before television program data is written to the storage device 124, it is parsed in software for PCR-index data, because the data in the recording stream should be indexed by its PCR so that playback of this data can be done based on an accurate timestamp. This does not impose much of a processing penalty, as only a small fraction of the data needs to be read by the CPU for creating the PCR index, and reading the first 12-bytes of every 188 bytes in the packet can be sufficient to index the data properly. In one implementation, recording of live streams can send out 188×7 sized payloads, and it is very easy for the CPU to find the PCR index values for indexing. The index data is extracted and written to disk in a separate index file before actual record data is written to the storage device 124.

After DMA 314 has written the television program data to the storage device 124, the socket buffers 324 are immediately freed so that the network driver 322 can reuse then to receive another buffer. The user thread then returns from the read system call, with data ready to be written in its user buffers. The user buffer may take some time to be written to disk. Meanwhile data is being accumulated in the network socket buffers, with a limit of 512 packets being able to be stored in the socket buffers. However, no data will be lost, as any dropped packets are retransmitted by the STB 110, 112, or 114 in according to the TCP/IP protocols. In addition, if packets are dropped or lost, data automatically will be sent faster than the actual arrival rate, so that the STB and the network storage server 112 can sync up.

After the write to disk is completed, the user buffers 324 are again ready to be submitted to the network driver 322, so that additional data can be DMA'ed to disk. The buffering scheme of accumulating socket buffers in the driver, in a special queue ensures no packets will be lost if the user processes can at least service the record engine about (i.e. writing to disk) once every 250 ms. Even if this is not possible, the TCP layer will not acknowledge further packets, which will cause the STB to retransmit packets. In a live situation, however, the STB may not be able to buffer more than 1-2 seconds of data, and at that point certain video frames may need to be skipped. This case should be very rare, and is handled as an exception, with the implementation free to skip as many bytes forward to catchup to the live content timeline.

After transmission of a stream of television program data, the TCP/IP session can be torn down by sending a TCP packet with a valid reset ("RST") control bit from the network storage server 122 to the STB 110, 112, or 114. This usually breaks the connection to the server, and the server hangs up. The client then uninstalls the protocol handler to the STOE 320 for this session. All trailing FIN transactions are handled by the normal protocol stack with FIN timeouts. The actual shutdown of a TCP/IP session is a complicated process, and the normal operating system protocol stack can handle the graceful shutdown and timeout of connections, at the end of a session.

An advantage of the techniques described herein is highperformance, low-CPU-usage for TCP/IP protocol implementation sufficient to handle high bandwidth reception of television programs for storage and simultaneous playback of timeshifted version of such television programs. Because the necessary CPU processing power is relatively low, inexpensive processors can be used to implement the reception and storage and subsequent playback of television program data delivered through TCP/IP networks. In particular, a 300 MHz class MIPS processor can be used to receive and route multiple, high-bandwidth HDTV streams simultaneously to playback processors for display on display devices.

The record-oriented STOE provides lower latency and is well suited for video applications. Video streams delivered at 20 Mbps transmission rates require handling 1-2 Ethernet packets per millisecond, and transmission through a traditional TCP/IP protocol stack increases latency. The record-oriented STOE 320 reduces latency by acknowledging packets immediately. In addition, the STOE can signal missing packets proactively, by sending three duplicate ACK packets for the previous received packet when an expected packet is not received.

The specific implementation of the STOE 320, which triggers the fast retransmission of packets by the STB 110, 112, or 114, tends to recover and reduce jitter during retransmission of packets. This is because the network storage server 122 will send ACK packets more frequently until its buffers are full. This forces the sending STB 110, 112, or 114 to send data more frequently, speeding up communication. Thus, even if a 100 ms delay occurs when receiving a retransmitted missing packet, the subsequent packets arrive faster, and after buffering of 1-2 megabytes in the receive buffer 324 the delay may be negligible.

The STOE 320 also can be quite useful when used with a wireless network connection 132, where the network packet loss rate is relatively high and error recovery is critical. The TCP/IP based protocols are ideal for the wireless medium, and the STOE 320 allows the client to meet or exceed necessary criteria for wireless video delivery.

Use of the STOE 320 also results in a lower memory footprint as well as a lower memory bandwidth requirement. The packet copying from kernel space to user space not only consumes CPU bandwidth, but it also uses additional memory, as well as memory bandwidth, and both of these are conserved by using the STOE methodology.

Basic requirements for implementing the STOE are receipt of data over a connection-oriented protocol (e.g., TCP/IP) and a software hook and filter for implementing the STOE. All modern operating system provide this capability. STOE processing is done at the boundary between the MAC layer and the IP layer, so that ACK packets are generated close to the network layer and are transmitted immediately from a position one step away from the network interface, which results in fast turnaround time and higher data throughput, thus avoiding the latency of processing that often slows down TCP/IP. For simplification, no checksums need to be computed on data payloads because Ethernet hardware/wireless hardware takes care of this. A simplified state machine for processing ACKs is provided, and a simplified algorithm of dropping all packets out of sequence works well in practice, giving sub-200 ms latencies that are tolerable for video playback.

Figure 5:
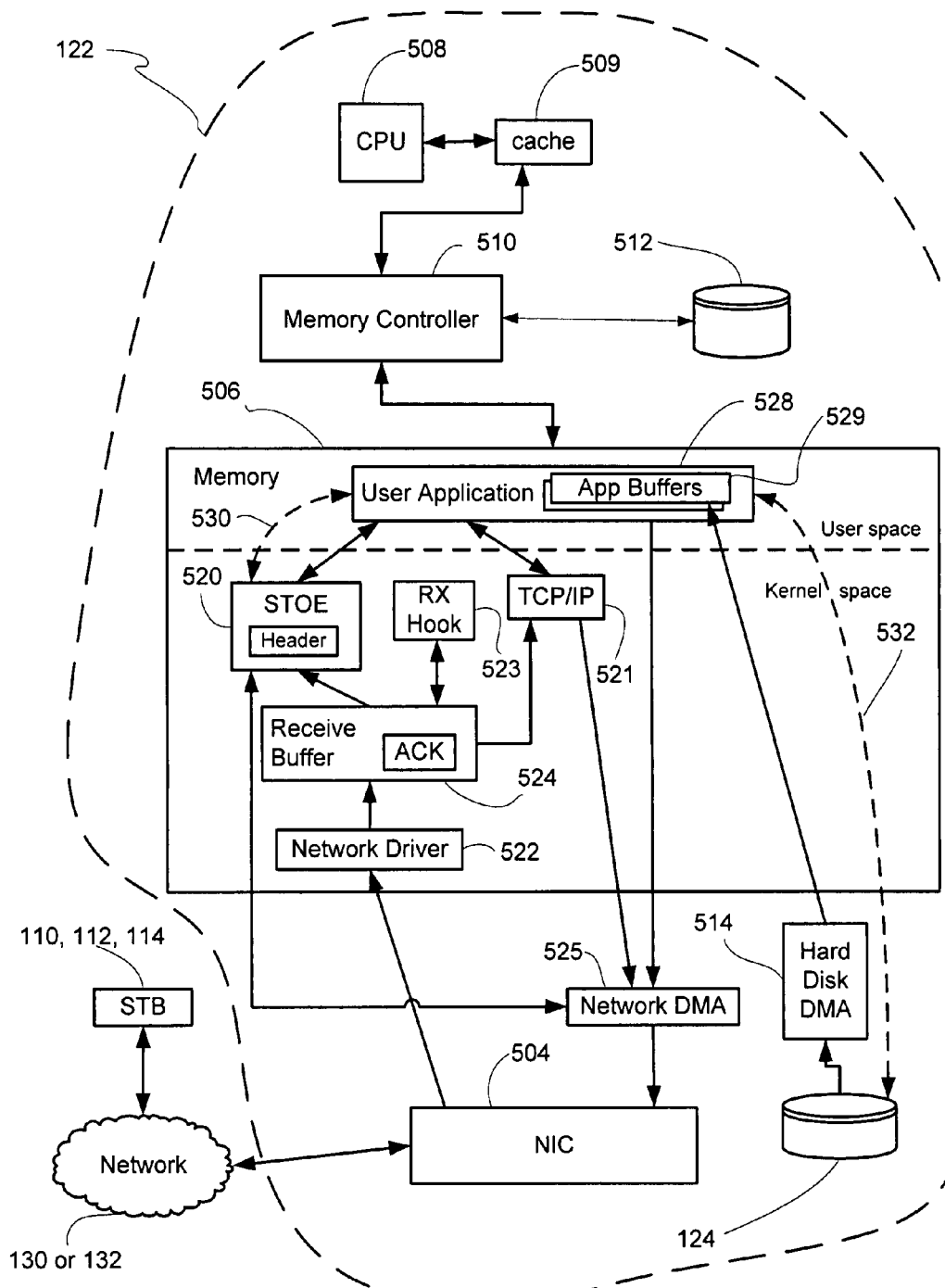
FIG. 5 is another schematic diagram of a client network storage server adapted for playing back digital television programs over a network, for example, by a playback-oriented software based TCP/IP offload engine for making fast and error-free transmissions of data from one network device to another.

To stream a stored television program from the storage device 124 of the network storage server 122 to a STB 110, 112, or 114, TCP/IP packets that make up the television program can be transmitted with the aid of a playbook-oriented STOE that enables the efficient streaming of the television program to from the storage server 112 to the STB. In one implementation, a timeshifted version of a program can be streamed to a STB for playback as the program is recorded to the storage server 122. FIG. 5 is a schematic diagram of a client network storage server adapted for playing back digital television programs over a network, for example, by a playback-oriented software based TCP/IP offload engine for making fast and error-free transmissions of data from one network device to another. As shown in FIG. 5, the television program can be streamed from a network interface 504 in the network storage server 122 over a network connection 130 or 132 to the STB 110, 112, or 114. The server 122 includes a central processing unit 508 that performs operations on data and that, in conjunction with a memory controller 510, can copy data to different locations in the memory 506.

TCP/IP packets of television program data stored on the permanent storage device 124 can be streamed from the network storage server 122 that includes a playbook-oriented STOE 520 though a network connection 130 or 132 to a STB 110, 112, or 114 for playback. The network storage server 122 is connected to the network through a network interface 504 (e.g., a network interface controller (NIC)). The network storage server 122 includes a CPU 508 that performs operations on data and that, in conjunction with a memory controller 510, can copy data out of an into different locations in a main memory device 506. The CPU 508 is operatively coupled to a local cache 509 that stores copies of the data fetched from the main memory 506. The CPU 508 can perform operations on the cached data and then, once the operations have been performed, the data in the main memory 506 can be updated to be consistent with the new data in the cache 509. The network storage server 122 also includes a non-volatile memory 512 suitable for embodying computer program instructions and data that are executed and/or processed by the CPU 508. Certain elements of the system shown in FIG. 5 can all be located on a single chip to form a system on a chip ("SOC"). For example, two or more of the CPU 508, cache 509, memory controller 510, memory 512, and memory 506 can be located on a SOC.

As shown in FIG. 5, TCP/IP data packets can be read from the permanent storage device 124 through a hard disk DMA 514 using a direct-IO method into user space buffers 529 within a user application 528. Without the playback-oriented STOE 520, using the normal TCP/IP stack 521, data packets would be received by an application 528 running on the network storage server 122 and then copied in various stages from application layer buffers 529 to a socket layer and then to the TCP/IP stack 521 and all the way down to the NIC 504. The TCP/IP stack 521 also would receive an acknowledgement packet ("ACK") from the STB 110, 112, or 114 via the NIC 204 for every transmitted packet and would maintain the communications channel alive by handling requested retransmissions with the client. Within the IP layer, the IP packet headers of received packets must be validated, and checksums must be performed. Within the TCP layer, processing of packets includes copying the packets from user space to socket space, receiving ACK packets from the client and releasing data in buffers, creating TCP checksums and headers for the transmission of data packets to the client, sending payload data with the appropriate header, validating the checksum of received packets at the TCP layer, and managing state machines for retransmission of packets.

With the assistance of the playback-oriented STOE 520, as explained in more detail below, payload data for packets being streamed out from the network storage server 122 to the STB 110, 112, or 114 can be received from the permanent storage device 124 and combined with appropriate pre-formatted headers generated by the STOE 5201 and then transmitted over an Ethernet connection to the STB 110, 112, or 114 with minimal packet copying within the network storage server 122. As explained above with reference to FIG. 3, using pre-formatted headers generated by a STOE can significantly reduce the processing and memory resources required from the server to stream data to STB 110, 112, or 114. With the pre-formatted headers supplied by the STOE, the packetized data be routed directly from the application buffers 529 to NIC 504 for transmission to the STB 110, 112, or 114, without first being passed through the traditional TCP/IP stack 521. The playbook-oriented STOE 520 also receives all ACK packets from the STB 110, 112, or 114 and performs the necessary computations to handle flow control and retransmissions of packets (when necessary). The STOE can also manage the TCP state machine without the assistance of a helper socket. Thus, the STOE 520 can conserve processing and memory resources with respect to using the standard TCP/IP stack 521 because packets do not need to be copied to several different memory addresses as they are moved from the application buffers 529 to the NIC 520.

To choose between using the playbook-oriented STOE 520 and the normal TCP/IP stack 521, after a communications channel is established between the network storage server 122 and the STB 110, 112, or 114 and an ACK packet is received by the network storage server 122, a receive filter ("RX Hook") 523, which can be implemented in software, can be used to determine when to initiate the playbook-oriented STOE 520 and forward packets to the STOE while bypassing the TCP/IP stack 521 and when to pass the packets to the TCP/IP stack 521. Similarly, a software-implemented transmit filter can be used to determined when to use the STOE 520 to process packets for sending from the network storage server 122 to the STB 110, 112, or 114. These hooks provide inter operability with the standard protocol stack, while the STOE 520 operates.

As the control paths 530 and 532 show, the user application 528 intervenes only when setting up and tearing down the TCP/IP session with the STB 110, 112, or 114 and when setting up the playbook-oriented STOE 520 to start/stop operation of the STOE. In this manner several processing steps that would otherwise consume CPU cycles in the data path are reduced. For example, and as described in more detail below, the acknowledgement of received packets back to the STB 110, 112, or 114 can be simplified by using pre-stored headers, such that less data needs to be processed when sending an ACK packet; copying TCP/IP packets to user space can be eliminated; and checksum validation of data can be completely eliminated in the TCP layer.

As described above with respect to FIG. 3, several modifications to the traditional TCP/IP protocol can be made to provide a simple STOE that can efficiently process the data traffic that is streamed from the network storage server 122 to the STB 110, 112, or 114. As described above, the sequence numbers between the network storage server 122 and the STB 110, 112, or 114 can be synchronized, and the sequence number field 306 can contain the initial sequence number ("ISN") used in a connection, where the ISN is a randomly selected number. Then, the value of the first data octet is ISN+1. When the network storage server 122 operates with the playbook-oriented STOE 520 to stream data from the network storage server 122 to the client, the value of the sequence number field 306 is the byte offset in the stream plus the initial sequence number. Thus, the value of the sequence number field 306 identifies a packet, and if a STB 110, 112, or 114 sends a message that it did not receive a particular packet and requests retransmission, then the packet can be retransmitted from the server based on the requested sequence number.

If the ACK control bit is set, the acknowledgement number field 308 can contain the value of the next sequence number that the sender of the segment is expecting to receive. Once a connection is established, this value is always sent. In the STOE operation, for packets transmitted from the network storage server 122 to the STB 110, 112, or 114 this number is constant. For packets received from the STB acknowledging receipt of a streamed packet, the value of the ACK number field provides information about which packet has been received by the STB. The data offset field 310 contains the number of 32-bit words in the TCP header, which indicates where the data begins. The TCP header (even one that includes options) generally has a length that is an integral number of 32 bits. When using the playbook-oriented STOE 520, the value of the offset field value can be set to a constant value (e.g., 8, which gives a 32 byte TCP Header). Thus, the STOE uses only the acknowledgement bit 316, the synchronize bit 322, the reset bit 320, and the finish bit 324, while other control bits of the TCP header are ignored.

When using the playbook-oriented STOE 520, there is no need for sliding window adjustment, because data is consumed directly from the socket buffers by a playback engine on the STB 110, 112, or 114. The window can have a fixed size chosen to equal one maximum transmission unit ("MTU") (e.g., 1448 bytes) at the network storage server 122. Therefore, value of the window field 326 can be set to this constant value.

The checksum field 328 is the 16 bit one's complement of the one's complement sum of all 16-bit words in the header and text of a packet. If a segment contains an odd number of header and text octets to be check-summed, the last octet is padded on the right with zeros to form a 16-bit word for checksum purposes. The pad is not transmitted as part of the segment. While computing the checksum, the checksum field itself is replaced with zeros. Packets received at the STB 110, 112, or 114 need not be check-summed because of the Ethernet cyclic redundancy check ("CRC") validity that is performed at the Ethernet datalink layer. However, in the network storage server 122 packets must be check-summed. For TCP packets that are 4-byte aligned in memory, an efficient method of performing the checksum is to use an algorithm that computes 2-byte checksums in parallel with using 32-bit instructions.

The playbook-oriented STOE 520 only needs a simple hook 523 to filter packets arriving at a designated TCP port of the network storage server 122. The hook creates a session between the network storage server 122 and the STB 110, 112, or 114 based on the source IP address and the destination port pair of the incoming packets. There is no need for a helper socket on the server side because all the information needed to talk back to the STB 110, 112, or 114 can be deduced from the Ethernet and IP headers of the received ACK packet by swapping the sequence ("SEQ") number and ACK numbers.

The processing of a synchronization ("SYN") packet is used to handle connection establishment. The STB 110, 112, or 114 sends an initial SYN packet to the network storage server 122, and the initial SYN packet needs to be acknowledged by adding +1 to the sequence number of the received packet. Thus, an ACK packet having an acknowledgement number equal to the sequence number of the received SYN packet +1 is created within the network storage server 122 and sent back to the STB 110, 112, or 114 as the acknowledgement packet. In addition, the network storage server 122 can pick a random 32-bit unsigned integer as its initial sequence number. This initial sequence number is used to make up the initial SYN-ACK packet. The SYN-ACK can be a 66 byte packet with only the header fields.

After receiving the server's SYN+ACK packet from the server, the STB 110, 112, or 114 sends an ACK packet again, which constitutes the three-way handshake to establish the connection, and the connected system call succeeds. Then, the network storage server 122 is ready to stream television program data to the STB 110, 112, or 114, and it also has pre-stored a transmission header template to use when communicating with the client.

A packet received from the STB 110, 112, or 114 (e.g., a SYN packet) by the network storage server 122 can be used to generate a template header for sending out packets from the server. The template header is based on the Ethernet, TCP, and IP headers of the received packet and information in these headers from the received packet can be largely reused when streaming data from the server to the client. If the connection state does not change, the server-side TCP header only needs to change the value of the sequence number field when a new SEQ packet is sent out or the server-side TCP header only needs to change the value of the acknowledgement number field when a new ACK packet is sent out. Therefore, a reusable header template containing static values used in the TCP/IP header that do no change during a session can be generated based on the initial SYN/SYN-ACK/ACK handshake that is used to establish the server-client connection, and this header template can be stored in memory 506 for later reuse when preparing packets for streaming from the server to the client. An assumption can be made that the window size is at least as large as 188×7 bytes, which is generally true, since the client is generally configured to receive a 1-MTU Ethernet frame. If this condition is not met, in addition to modifying the TCP header, the IP header also can be modified to send packets of a length smaller than 188×7.

Figure 6:
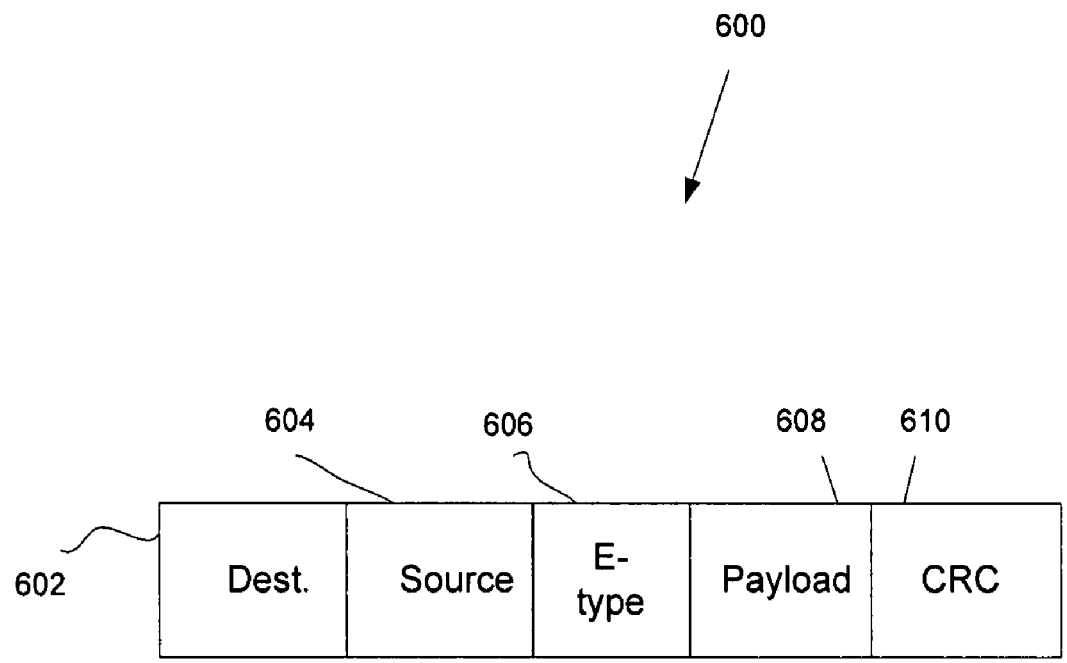
FIG. 6 is a block diagram of an Ethernet frame.

FIG. 6 is diagram of a possible Ethernet frame format 600 that includes an Ethernet destination address field 602, an Ethernet source address 604, an Ether TYPE field 606, payload data 608, and a CRC field 610. Therefore, in the header template the Ethernet destination address field can be filled in based on information in the source field 604 of a frame received from the STB 110, 112, or 114 and an Ethernet source address field that is filled in based on information in the destination field 602 of a frame received from the client. The Ethernet header also includes an Ether TYPE field that is filed in based on information in the Ether TYPE field 606 of a received packet and usually the value corresponds to IP over Ethernet.

The IP Header of the header template can include the following fields:
  IP TOS, which indicates a type of service that can be selected to give network priority. Usually IP TOS=0 will suffice for this field.
  IP ID=0, which can be ignored usually when packets are not fragmented.
  IP Frag_Offset=0, which indicates that packets should not be fragmented.
  IP TTL, which indicates the value of a time to live ("TTL") counter that is decremented every time a router handles the packet. If the value of the TTL field reaches zero, the packet is discarded, preventing packets from running in circles forever and flooding a network. The initial IP TTL value can be set equal to a relatively small number, e.g., 32.
  IP Ver, which indicates the IP version and can be set equal to 4.
  IP HeaderLen, which indicates the number of 32-bit words forming the header and can be set to 5.
  IP TotalLen, which is the total length of the header and can be set to 52, which is the sum of the IP header length (20 bytes) and the TCP header length (32 bytes).
  IP Protocol, which indicates the value of the IP protocol and can be set equal to 6 to indicated TCP protocol.
  IP Src address, which is the IP Source address value that is filled in from the destination address of the received packet,
  IP Dest address, which is the IP Destination Address that is filled in from the source of the received packet.

Based on the information in this IP header template, an IP header checksum calculation can be performed, using a well-known algorithm. In one implementation, the IP header is 4-byte aligned, and the algorithm simplifies to a simple function, ip_fast_csum (fast checksum function). Once the checksum is calculated, it is populated in the IP CHECKSUM field in the IP header.

The TCP header of the header template can include the following fields:
  TCP SOURCE PORT, which has a value that is filled in based on the destination port value from the received packet, as described above.

TCP DEST PORT, which has a value that is filled in based on the source port value of the received packet, as described above.

ACK, which is set to 1.

FIN, which is set to zero during streaming of data while the session is connected.

SYN, which is set to zero while the session is connected.

RST, which is set to zero while the session is connected.

ACK, which has a value of the sequence number of the packet that is expected next from the client.

SEQ provides an index number of the transmitted packet.

TCP Window is size set to 1448 (i.e., single maximum transfer unit ("MTU") size). The assumption is that the window is at least as big as one 188×7 byte window. This is usually true, as the receiver size always can accept at least 1-Ethernet MTU. If this condition is not met, the IP header as well as TCP header can be recomputed to send packets of different length smaller than 188×7. This would be a rare occurrence as well, and does not happen frequently with modern protocol stacks.

doff=data offset=8 (specifies TCP header size as 32 bytes) is the data offset value that is set to 8, which specifies the header size as 32 bytes, with the values of all other fields being set to zero.

Fields of the TCP header that change during data transmission include a checksum field and a sequence number ("SEQ") field. The value of the SEQ field is incremented for successive packets, and an initial checksum value can be calculated based on the values of fields in the TCP header that do not change. The checksum calculation also must be re-computed each time a new packet is received.

Once the connection between the network storage server 122 and the STB 110, 112, or 114 is established, the playbook-oriented STOE 520 automatically takes over the communications with the client and transmits the streaming data directly to NIC 504 to send out over the network 502 to the client. The STB 110, 112, or 114 of the playbook-oriented STOE 520 is assumed to be a standard TCP/IP client that need not receive any indication that it is communicating with the STOE 520. Therefore, the STOE is completely inter-operable with any type of TCP/IP capable client device that accepts streaming data over TCP/IP.

After the server-client connection is established and the server 520 begins sending out data packets to the client, the static value in the Ethernet, IP, and TCP template headers can be used as the headers of the packets that are sent out from the server to the client. Only the values of the TCP header's SEQ field and the value of the checksum field need to be updated and inserted into the variable fields of the template header used for outbound packets. Thus, a packet header template containing the static values of the header can be stored in the memory 506, and the CPU 506 only needs update the variable values of the header template (e.g., the value of the acknowledgement number field and/or the sequence number field) before pre-pending the header template to a payload data to form a packet and then sending out the packet. Therefore, the CPU 508 only needs to writeback (or export) data that pertains to the variable values in the header template from its cache 509 to the header template in main memory 506. Because the relatively little data needs to be written back from the cache to the main memory CPU and memory resources are conserved and the STOE can operate quite efficiently.

After a packet has been prepared with the appropriate header (i.e., containing the static fields and the variable fields, as defined by the CPU 508), the playbook-oriented STOE 520 can instruct the Ethernet DMA 525 to grab the packet from the application buffer 529 and send the packet to the STB 110, 112, or 114. Then the information pertaining to variable portions of the header is flushed from a CPU-cache, and the packet is sent out via the transmit hardware. Finally, the packet is sent out over the Ethernet hardware.

After the server-client connection is established, the network storage server 122 sends data to the STB 110, 112, or 114. Within the network storage server 122, the number of the packet that has last been acknowledged by the STB is compared with the sequence number of the packet that is ready to be sent out from the network storage server 122. If the client's acknowledgement is not for the current packet, then the server must retransmit a packet that it previously attempted to send. For example, if the ACK packet from the client is not received for one receiver window length before the current sequence number, the transmission can be stalled for a certain time period (e.g., 20-40 ms), and then retransmission can occur from the point of the missing packet. Alternatively, the server can wait to receive three duplicate ACK packets from the client, and then begin retransmitting from the missing point, whichever occurs first.

The playbook-oriented STOE 520 keeps track of the next sequence to transmit. If the acknowledgement for a packet that is sent out is not received within one window size from the current sequence number, the packet for which the sequence number is missing can be retransmitted, after a timeout period. The length of the timeout period can be adjusted depending on the bandwidth requirement of the media file being transmitted. Usually a 20 ms timeout period is sufficient and not too aggressive and has the effect of providing an extremely fast, proactive server-side retransmission of missing packets. Thus, the playbook-oriented STOE 520 can transmit one packet about every 1 ms until acknowledgements are received and the client has caught up. The STB 110, 112, or 114 may also request fast retransmission by sending three duplicate ACK packets for the previous packet to indicate that the network storage server 122 should back up to the missing data packet and start retransmitting from the missing packet.

Data can be fed from the user application 528 to the playbook-oriented STOE 520 from a ring buffer, such that it is possible to search back to packets from the past 1-million bytes or so in the past, in sequence number. This means that it is possible to locate and send back the packets that exist in the ring buffer, if a retransmission is requested. In the case of live streaming, an algorithm can be used for streaming from the hardware record buffers, which are large enough to allow searching back to previous sequence numbers. In normal operation, it is generally not necessary to search behind more than 64K or so of data, because the maximum window size is usually 64K. Therefore, it is quite reasonable to assume that a missed packet could be found in an application buffer 529.

In one implementation of the playbook-oriented STOE 520, after a retransmission is requested, the STOE can retransmit all the packets that have been transmitted since the last successful transmission of a packet was acknowledged. This methodology works with latencies acceptable in the video buffer model. This jitter when using the STOE 520 is very low (e.g., under 50-100 ms), which is a big improvement over the standard TCP/IP algorithm with slow-start mechanism which can introduce jitter on the order of 200-300 ms.

Transmission of packets from the network storage server 122 tends to speed up after retransmission, if the server is pacing to a PCR, and will send data faster than normal to catch up the clock tick, which can be set to a predetermined frequency (e.g., 27 MHz). This has the automatic effect of reducing the jitter observed at the video decoder, because after every dropped packet, the server automatically speeds up to compensate for the delayed time lag.

An advantage of the record-oriented STOE 320 and the playbook-oriented STOE 520 described herein is high performance, very low CPU usage for TCP/IP protocol implementation sufficient to handle high bandwidth transmission of television programs over a network for storage on a networked storage server or for streaming from the networked storage server for playback at a remote location. By using the record-oriented STOE 320 and the playbook-oriented STOE 520 multiple television programs can be recorded to the network storage server 124 while multiple television programs are streamed from the server 124 to edge devices 110, 112, and 114 for play back on display devices. It is also low cost (i.e., there is no need for additional hardware assist, requiring additional silicon). The STOE allows a 300 MHz class MIPS processor to compete effectively with 2.5+ GHz class CPUs in the transmission of multiple, high bandwidth HDTV streams simultaneously. The STOE is capable of operating over any NIC, including wired Ethernet, wireless, and emerging new standard Ethernet over cable (MoCA). The STOE works side by side with the standard TCP/IP protocol stack, and allows the standard protocol stack to process non-video/audio data seamlessly. Therefore, all applications that were designed to run over IP, UDP or TCP type network protocols work seamlessly with STOE. The fact that CPU power required to serve error free content delivered via TCP/IP is less than 5% of the available bandwidth means lower cost chips can be targeted to the IPTV platform, with the help of the STOE.

The STOE is a critical enabler for wireless. In wireless networks packet loss is higher, and error recovery is a must. The TCP/IP based protocols are ideal for the wireless medium. The TCP/IP is an end-to-end protocol, and protects against packet loss in any segment; especially if one of the segments is wireless.

The variations of the STOE method can be used for any type of connection oriented delivery of any type of data over a network medium, e.g. speeding up of downloads; accessing file server or web-servers etc. The requirement that must be met is that packet, or certain headers should be pre-computable for the lifetime of the session. Additionally, if must be possible to stream out directly from application buffers, without copying data to NIC buffers or kernel space buffers.

Figure 7:
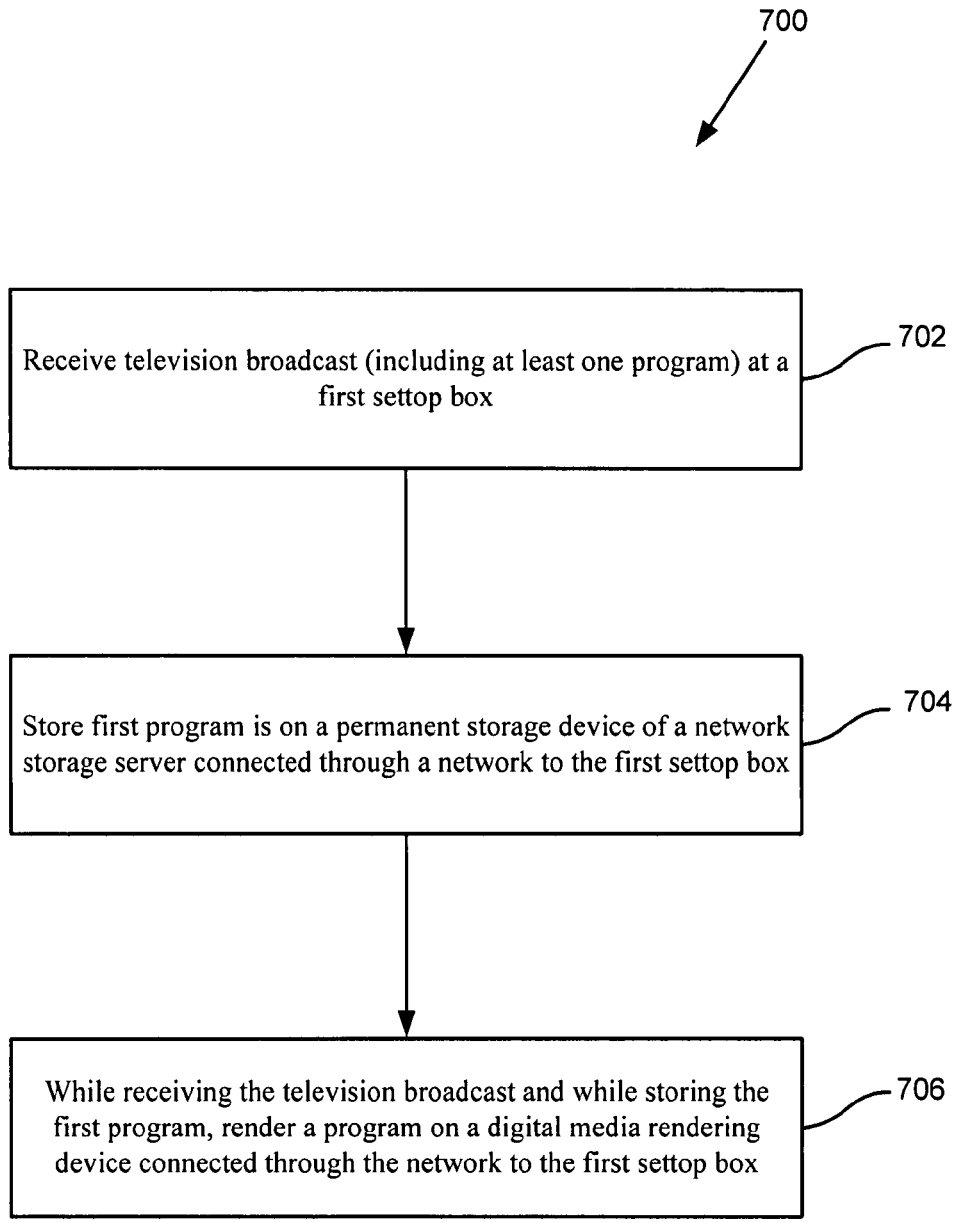
FIG. 7 is a flow chart of a method for playing back a television program on a playback device connected to a local area network while simultaneously storing a television program on a storage device connected to the network.

FIG. 7 is a flow chart of a method 700 for playing back a television program on a playback device connected to a local area network while simultaneously storing a television program on a storage device connected to the network. A television broadcast is received at a first settop box (step 702), where the television broadcast include a least one program. For example, a television broadcast can be received over a cable, DSL, or satellite connection at the settop box, and the television broadcast can include multiple programs. A first program is stored on a permanent storage device of a network storage server connected through a network to the first settop box (step 704). For example, a user may program the settop box to cause the television program to be stored on the permanent storage device. While receiving the television broadcast and while storing the first program, a program is rendered on a digital media rendering device connected through the network to the first settop box (step 706). For example, the user may program the settop box to cause the program to be rendered on a television connected to the settop box.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, modifications, substitutions, and changes can be made.

What is claimed is:

1. A method of playing back a television program on a playback device connected to a local area network while simultaneously storing the television program on a storage device connected to the network, the method comprising:
   receiving a television broadcast at a first settop box, wherein the television broadcast comprises at least one program;
   storing a first program on a permanent storage device of a network storage server connected through a network to the first settop box, wherein storing the at least one of the programs on the network storage server comprises:

establishing a connection between the settop box and the network storage server for a session according to a TCP/IP protocol;

receiving data packets corresponding to the first program from the settop box in a kernel space buffer of the network storage server, wherein the data packets include payload data and headers;

stripping the headers from the packets and routing the payload data directly from the kernel space buffer through memory-to-memory direct memory access circuitry (DMA), without processing through a TCP/IP stack, to a user space buffer of the network storage server;

writing the payload data in the user space buffer of the network through a hard disk DMA to a permanent storage medium of the network storage server defining a packet header template for acknowledging the receipt of the data packet, the template having a plurality of static fields filled with static values and a variable field adapted for carrying the value of a sequence number identifying the ACK packet within a sequence of a plurality of ACK packets sent from the network storage server to the network receiving during the session;

storing the header template in a memory location of a memory device of the network storage server;

updating, within the kernel space of the network storage server, packet-dependent values of the variable fields of the template stored in the memory device; and sending an ACK packet that includes a copy of the updated packet header from the network storage server to the settop box to acknowledge the receipt of the packet; and while receiving the television broadcast and while storing the first program, rendering a program on a digital media rendering device connected through the network to the first settop box.

2. The method of claim 1, wherein the program that is stored on the network storage server is different than the program that is rendered on the digital media rendering device.

3. The method of claim 1, wherein the program that is rendered on the digital media rendering device is a time-shifted version of the program that is stored on the network storage server.

4. The method of claim 1, wherein the first settop box is different from the digital media rendering device.

5. The method of claim 1, further comprising while receiving the television broadcast and while storing the first program, storing a second program on the network storage server, wherein the network storage server is also connected through the network to the second settop box.

6. The method of claim 1, further comprising while receiving the television broadcast and while storing the program, rendering another program on a second digital media rendering device connected through the network.

7. The method of claim 6, wherein the television broadcast comprises the other program.

8. The method of claim 6, wherein the other program is received from the memory device comprised by the network storage server.

9. The method of claim 1, wherein the static fields include a source field, a destination field, and a window size field.

10. The method of claim 1, further comprising writing updated packet-dependent values from a CPU cache to the template stored in the memory, wherein at least one static value used in ACK packet header is not written from the template to the CPU cache and back to the memory device.

11. The method of claim 1, wherein storing the first program on the network storage server comprises:

writing the program in discrete video frames to a storage medium comprised by the network storage server; and generating a time index of video frames of the program for use when playing back the program from the storage medium, so that the program can be rendered based on an accurate timestamp.

12. An apparatus for playing back a television program on a playback device connected to network while simultaneously storing the television program, the apparatus comprising:

an edge device adapted for receiving a television broadcast, wherein the television broadcast comprises a least one program;

a network storage server connected through a network to the edge device according to a TCP/IP protocol, the network storage server comprising:

a permanent storage medium, a kernel space buffer configured for receiving data packets corresponding to the program from the edge device, wherein the data packets include payload data and headers, a user space buffer, memory-to-memory direct memory access (DMA) circuitry configured for writing payload data that has been stripped from the headers from the kernel space buffer to the user space buffer, without processing through a TCP/IP stack, hard disk DMA circuitry configured for writing the payload data from the user space buffer to the permanent storage medium, a memory configured for storing a packet header template for acknowledging the receipt of the data packets, the template having a plurality of static fields filled with static values and a variable field adapted for carrying the value of a sequence number identifying the ACK packet within a sequence of a plurality of ACK packets sent from the network storage server to the network receiving during the session;

a software-based TCP offload engine configured for updating, within the kernel space of the network storage server, the packet-dependent values of the variable fields of the template stored in the memory device and sending an ACK packet that includes a copy of the updated packet header from the network storage server to the settop box to acknowledge the receipt of the packet.

13. The apparatus of claim 12, wherein the program being played back is a time-shifted version of the program being stored.

14. The apparatus of claim 12, wherein the network storage server is further adapted for streaming, while storing the first program, the first program for rendering on a first digital media rendering device connected through the network to the storage server and a second program for rendering on a second digital media rendering device connected through the network to the storage server.

15. The apparatus of claim 12, wherein the network comprises a wireless network.

16. The apparatus of claim 12, wherein the hard disk DMA circuitry is configured for writing the program in discrete video frames directly to the storage medium and for generating a time index of video frames of the program for use when playing back the program from the storage medium, so that the program can be rendered based on an accurate timestamp.

17. The apparatus of claim 12, wherein the edge device does not comprise a storage medium adapted for storing television programs.

* * * * *